(12) United States Patent
Muroga et al.

(10) Patent No.: US 6,809,920 B2
(45) Date of Patent: Oct. 26, 2004

(54) ELECTRONIC DEVICE HAVING PANEL BODY

(75) Inventors: Toshiqui Muroga, Tokyo (JP); Seiji Kurauchi, Kanagawa (JP); Yuichiro Nishioka, Tokyo (JP); Yutaka Tanaka, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 10/311,362

(22) PCT Filed: Apr. 19, 2002

(86) PCT No.: PCT/JP02/03931

§ 371 (c)(1),
(2), (4) Date: Apr. 25, 2003

(87) PCT Pub. No.: WO02/087299

PCT Pub. Date: Oct. 31, 2002

(65) Prior Publication Data

US 2003/0161095 A1 Aug. 28, 2003

(51) Int. Cl.⁷ .................................................. G06F 1/16
(52) U.S. Cl. .............................. 361/681; 369/36; 701/1; 355/3 R
(58) Field of Search ................................ 361/724–727, 361/679–687; 369/34, 36, 38; 701/1; 355/3 R, 14 E

(56) References Cited

U.S. PATENT DOCUMENTS 4,852,032 A * 7/1989 Matsuda et al. ............ 361/680
5,099,466 A * 3/1992 Kimura et al. ........... 369/30.81

FOREIGN PATENT DOCUMENTS

| JP | 2-285578 | * 11/1990 |
| JP | 5-78649 | * 3/1992 |
| JP | 5-90674 | * 4/1992 |
| JP | 5-78649 | * 10/1993 |
| JP | 5-90674 | * 12/1993 |
| JP | 9-123842 | * 5/1997 |

* cited by examiner

Primary Examiner—Hung Van Duong
(74) Attorney, Agent, or Firm—Jay H. Maioli

(57) ABSTRACT

An electronic apparatus includes a first panel section having a control surface or a display surface, and a panel assembly constructed by detachably mounting the first panel section on a second panel section. A driving mechanism is provided so as to change the attitude of the second panel section. In the detachment position of the first panel section, the attitude of the second panel section is determined so that the second panel section tilts toward the front of the apparatus.

6 Claims, 18 Drawing Sheets

ELECTRONIC DEVICE HAVING PANEL BODY

TECHNICAL FIELD

The present invention relates to a technique of easily detaching a detachable panel section having a control surface or a display surface in an electronic apparatus.

BACKGROUND ART

Electronic apparatuses are known in which a panel assembly (control panel) is provided with a control surface having a plurality of control keys and a display surface having a plurality of display elements, these apparatuses are, for example, audio apparatuses, such as cassette players or optical disk players, and video apparatuses.

Another apparatus is known in which a panel section having a control surface and a display surface is detachably mounted in a panel assembly.

In the known apparatuses, when the panel area of the control surface and the display surface of the panel assembly having a plurality of control switches and the like is limited, the number of switches, display elements, and the like must be reduced or the panel size must be increased.

Since a sufficient consideration is not given to the detachment of the panel section in the known apparatuses, the panel section cannot be easily removed from the panel assembly.

For example, in a car-mounted apparatus (audio apparatus or video apparatus), since the size of the control surface and the display surface is limited to a predetermined size (for example, 180 mm×50 mm), there is a need to incorporate required control buttons and display elements in an area of fixed size. As a result, the area is too small, and this restricts the design. For example, in order to incorporate control buttons of a size that allows ease of use and display elements of a size that allows high visibility in a limited area, it is necessary to consider the balance between the size of the control buttons and the like and the size of the control surface and the like, and therefore, the flexibility in design is decreased.

In a case in which the detachment operation must be performed in a narrow space, as in a car-mounted apparatus (for example, an audio apparatus), or must be performed in a hurry, if the operation cannot be easily performed, it is troublesome, and the ease of use of the apparatus is therefore reduced. Furthermore, it is necessary that an obstacle does not exist in the removing direction of the panel section, and this restricts the position at which the apparatus is installed.

DISCLOSURE OF INVENTION

The present invention removes restrictions on a control surface and a display surface and allows a panel section to be easily detached by substantially enlarging the control surface and the display surface.

In order to overcome the above problems, in the present invention, panel sections, each having a control surface and a display surface, are provided on the front and back surfaces of a support section, respectively, and one or both of the panel sections are detachably mounted in a panel assembly. The present invention includes a panel section having a control surface and a display surface, a panel assembly formed by detachably mounting the panel section on a support section, and a driving mechanism for changing the attitude of the support section. At the detachment position of the panel section, the support section is brought into a state in which it tilts toward the front of the apparatus.

In the present invention, since the panel sections are mounted on the front and back sides of the support section, respectively, and each of the panel sections has a control surface and a display surface, it is possible to make use of double the area of the known apparatuses. Since the panel section is detachable, the flexibility in design is increased. When the panel section is detached, the exterior of the apparatus is seen and no panel is visible, which is effective in crime prevention. Since the support section tilts toward the front of the apparatus when the panel section is detached, the panel section can be easily and quickly detached from the support section.

BRIEF DESCRIPTION OF THE DRAWINGS

FIG. 3 illustrates one of the panel sections.

FIG. 4 is a view of a detachable panel section.

BEST MODE FOR CARRYING OUT THE INVENTION

The present invention relates to an electronic apparatus having a panel assembly. Panel sections each having a control or display surface are provided on the front and back sides of the panel assembly, respectively, and are detachably mounted on a support section (support frame or base section).

While FIGS. 1 to 18 show an embodiment in which the present invention is applied to a car-mounted audio apparatus (for example, an optical disk player), the present invention is not limited thereto, and is widely applicable to various types of apparatuses. A panel section having a control or display surface is formed on each of the front and back sides of the panel assembly (two panel sections are provided).

Figure 1:
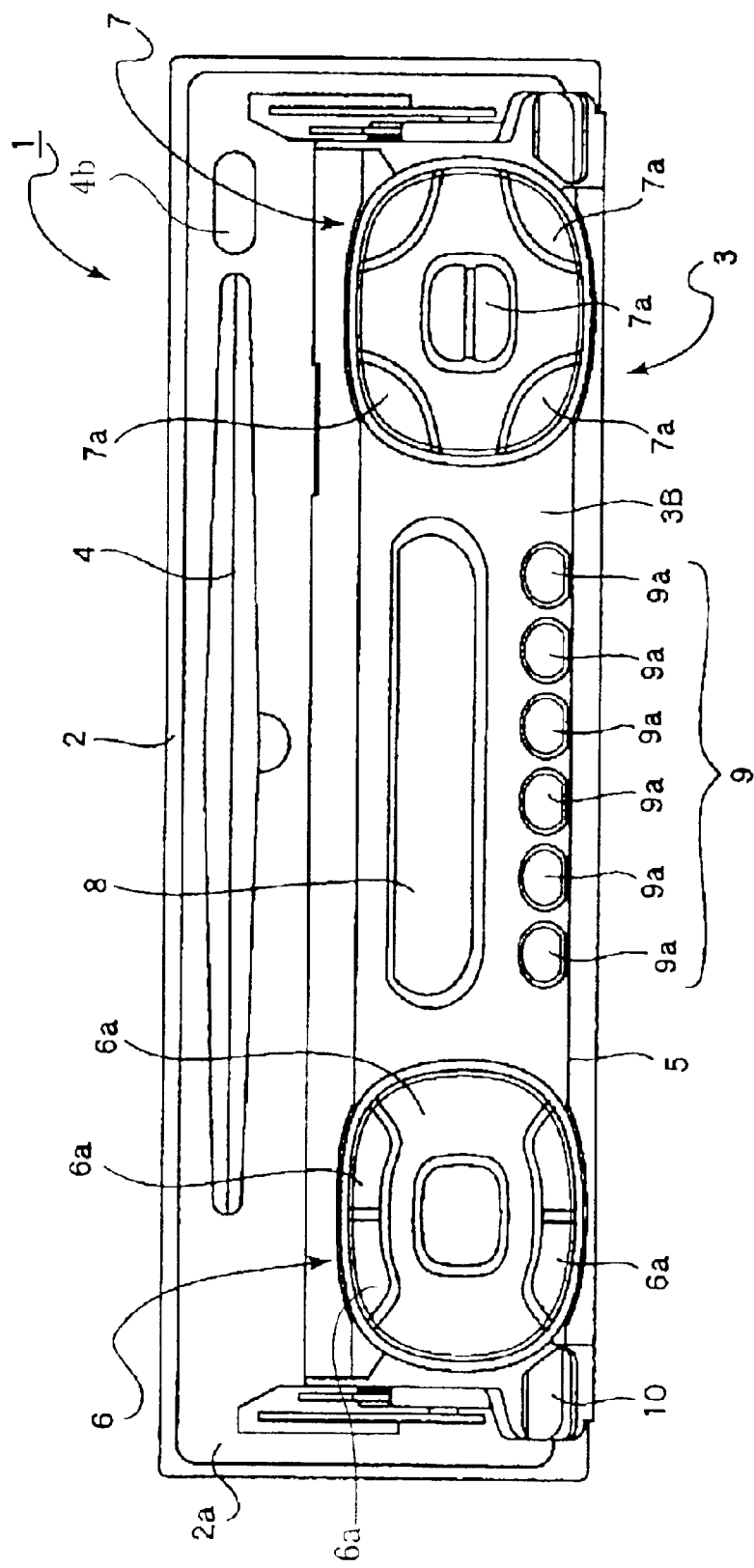
FIG. 1 is a front view showing an example of the configuration of an electronic apparatus according to the present invention.

FIG. 1 is a front view of an electronic apparatus 1 including a body section 2 and a panel assembly 3. (FIG. 1 shows a state in which the panel assembly 3 is open relative to the body section 1, as shown in the following FIG. 13 as a side view, that is, is placed at a second position.)

A front plate 2a of the body section 2 is provided with an insertion slot 4a for a disk-shaped recording medium, a receiving section 4b for a remote commander of a remote control device, and the like.

Multiple control buttons are arranged on a control surface 5 of a panel section 3B. That is, control sections 6 and 7 are placed close to the left and right ends of the control surface 5 in the longitudinal direction, and the control section 6 disposed on the left side of the figure includes multiple control buttons 6a. Similarly, the control section 7 disposed on the right side of the figure includes multiple control buttons 7a.

A display surface 8 is disposed between the control sections 6 and 7, is formed of, for example, a liquid crystal display (LCD), and displays various items, for example, time, volume, a song title, and frequency.

A control section 9 having control buttons 9a arranged in a horizontal row is disposed below the display surface 8.

A control button 10 disposed by the left side of the control section 6 is a "close" button (its function will be described later).

Figure 2:
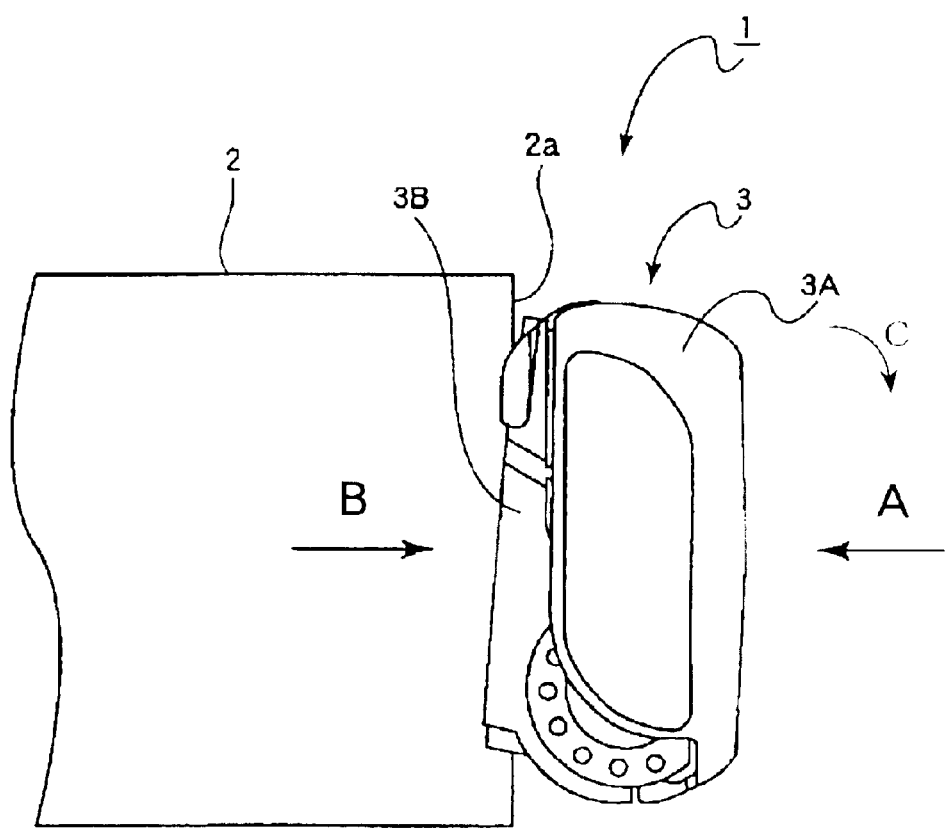
FIG. 2 is a side view of a body section and a panel assembly.

FIG. 2 is a side view of the body section 2 and the panel assembly 3, showing a state in which the panel assembly 3 is closed with respect to the body section 2 (the panel assembly 3 is placed in a first position in which it is in tight contact with the body section 2).

Since only one panel section 3A is detachably mounted in the panel assembly 3 in this embodiment, a panel section 3B also functions as a support section for the panel section 3A. Of course, a support section and the other panel section 3B may be separate so that the panel section 3B can also be detached from the support section.

Figure 3:
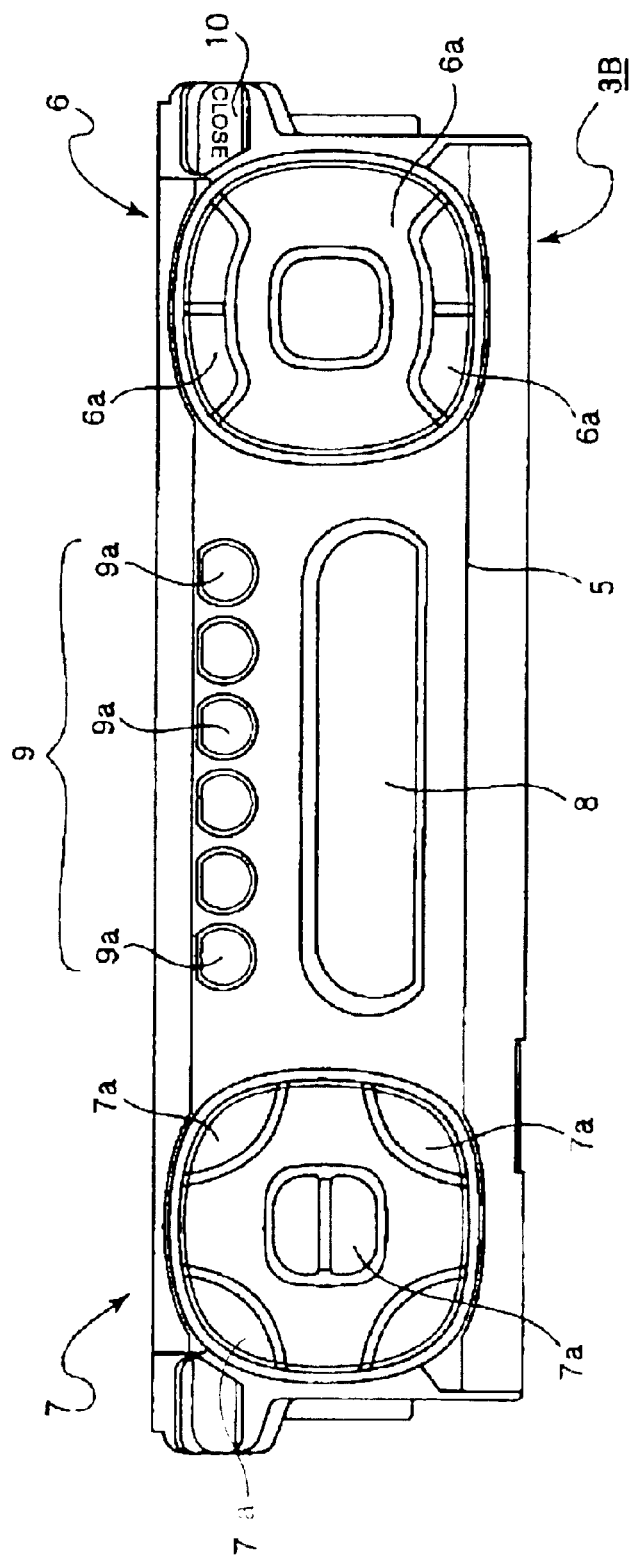
FIGS. 3 and 4 show panel sections.

FIG. 3 shows the panel section 3B, as viewed from the direction shown by arrow B in FIG. 2. Since the panel section 3B is viewed from the side of the body section 2 in a state in which the panel assembly 3 is closed, it is vertically and horizontally reverse to the panel section shown in FIG. 1. Arrow C represents the direction in which the panel assembly 3 pivots and tilts relative to the front plate 2a of the body section 2.

Figure 4:
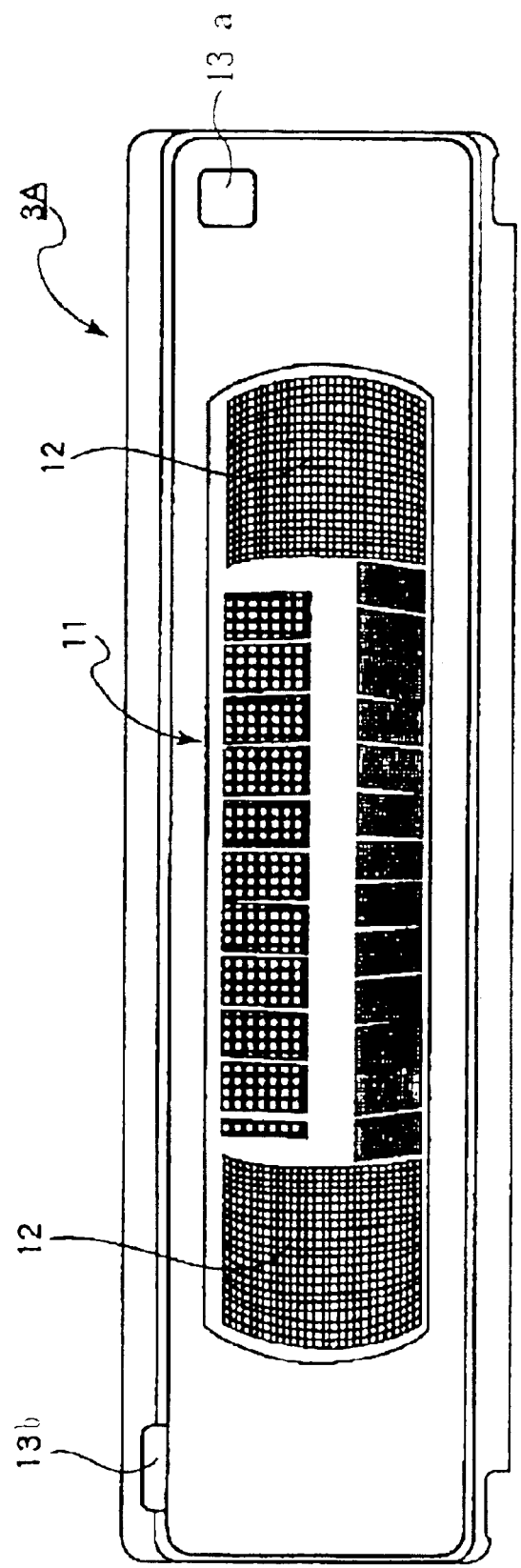

FIG. 4 shows the panel section 3A, as viewed from the direction shown by arrow A in FIG. 2. In this embodiment, there are provided a display surface 11 for displaying the items similar to those in the above-described display surface 8, and display sections 12 (for example, indicators for equalizer display) disposed on both sides of the display surface 11. The display surface 11 uses a liquid crystal display (LCD), and is set to be larger than the display surface 8 so that the user can more easily view it. A receiving section 13a is also provided corresponding to a remote commander of a remote control device. The panel section 3A uses a black panel so that it performs display with the brightness of the display element when the power is supplied, and so that it is black and displays nothing when the power is not supplied and when the panel section 3A is removed.

A control button 13b disposed on the upper left side of the panel section 3A is an "open" button (its function will be described later).

As described above, the two panel sections 3A and 3B each have the control surface and the display surface, and have functions as independent panels (that is, operating the control buttons and performing display).

Figure 5:
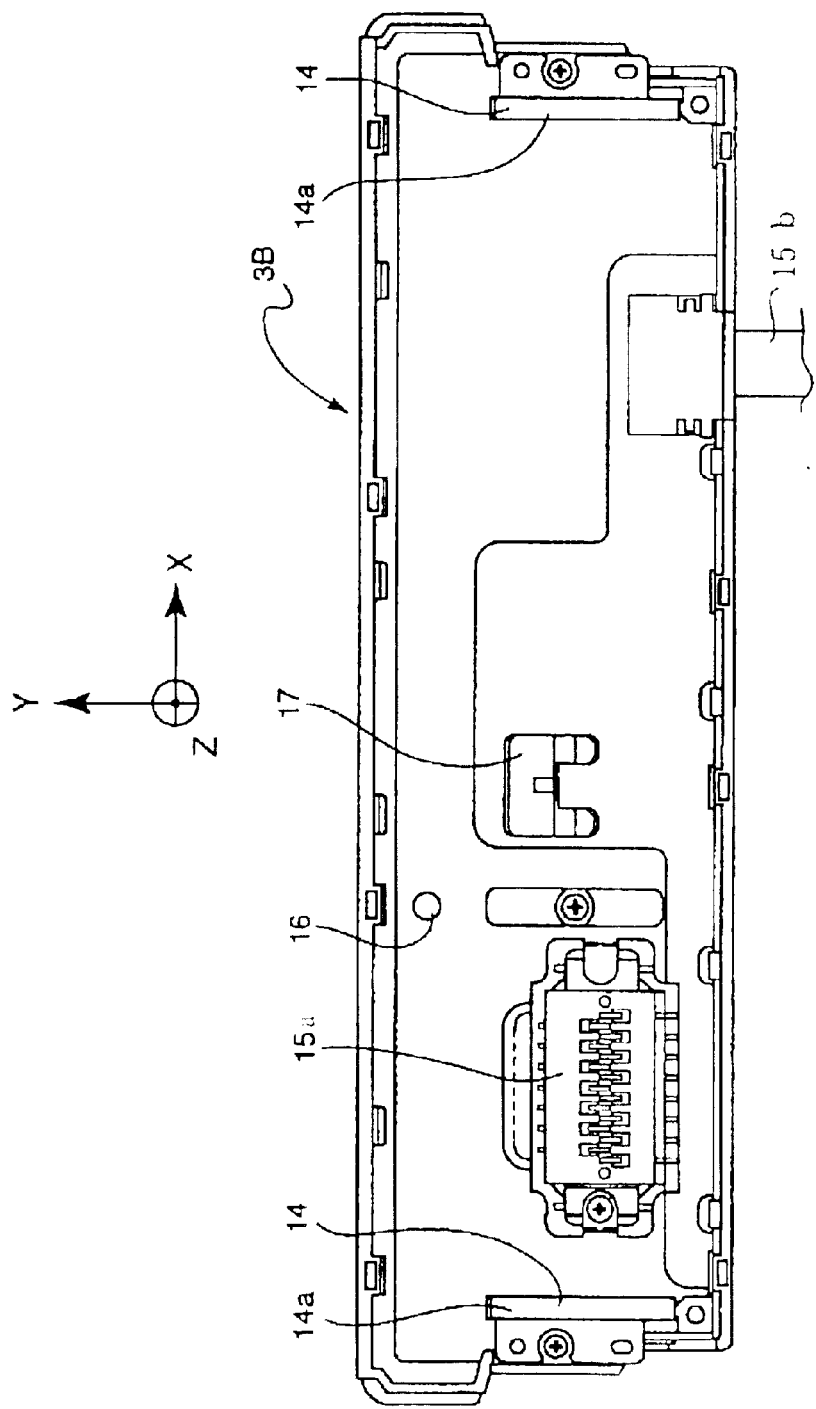
FIG. 5 is an explanatory view showing the attachment of the panel section 3A, in connection with FIG. 6, and shows the back of the panel section 3B.
Figure 6:
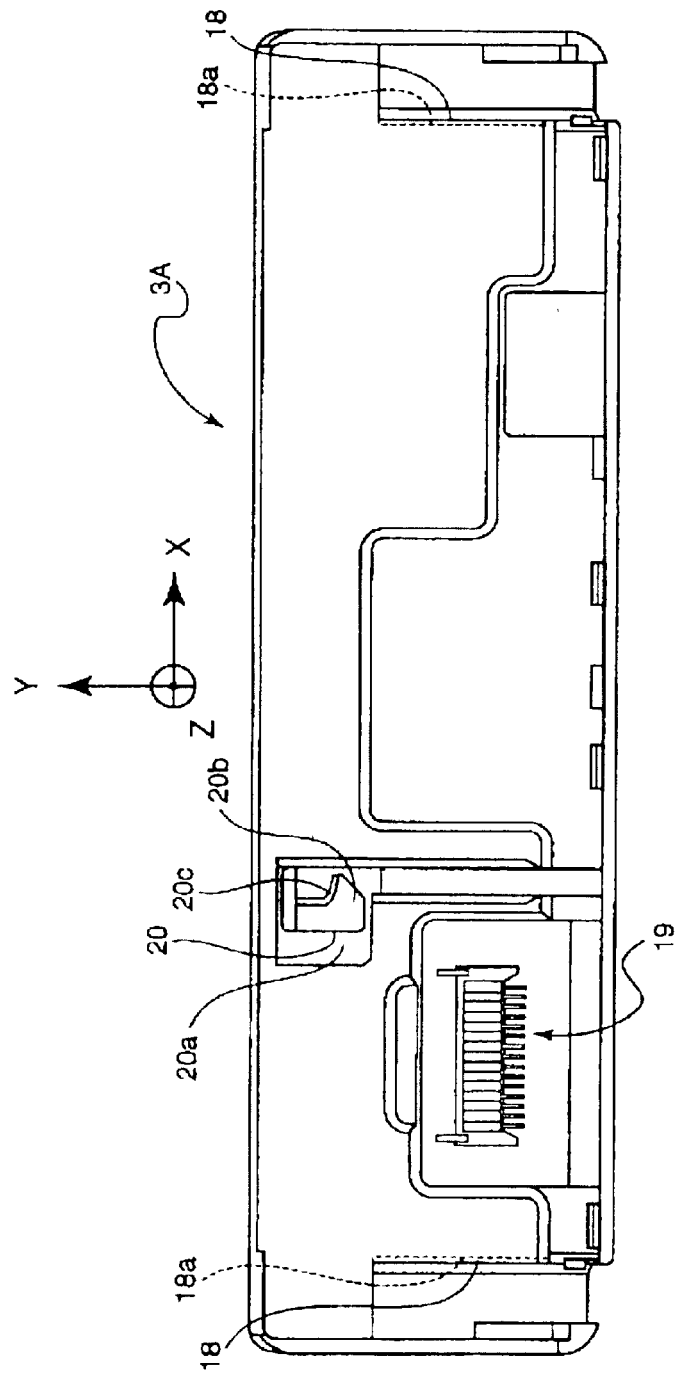
FIG. 6 is a front transparent view of the back of the panel section 3A.

FIGS. 5 and 6 explain the attachment of the panel section 3A. FIG. 5 shows a surface of the support section to be in contact with the panel section 3A, that is, the back surface of the panel section 3B, and FIG. 6 is a transparent view of a corresponding surface of the panel section 3A (transparent view of the back surface of the panel section 3A, as viewed from the front side). In these figures, the "Y"-axis represents the sliding direction in which the panel 3A is detached from the panel section 3B, the "X"-axis extends orthogonal thereto and in the longitudinal direction of the panel sections, and the "Z"-axis extends orthogonal to the Y-axis and the X-axis and perpendicularly to the planes of the figures. In a state in which the panel section 3A is detached from the panel section 3B, the control surface and the display surface are completely deleted, as shown in FIG. 5, and it is impossible to understand at a glance what the apparatus is. Therefore, it is effective in crime prevention that the panel section 3A is detachable.

Figure 7:
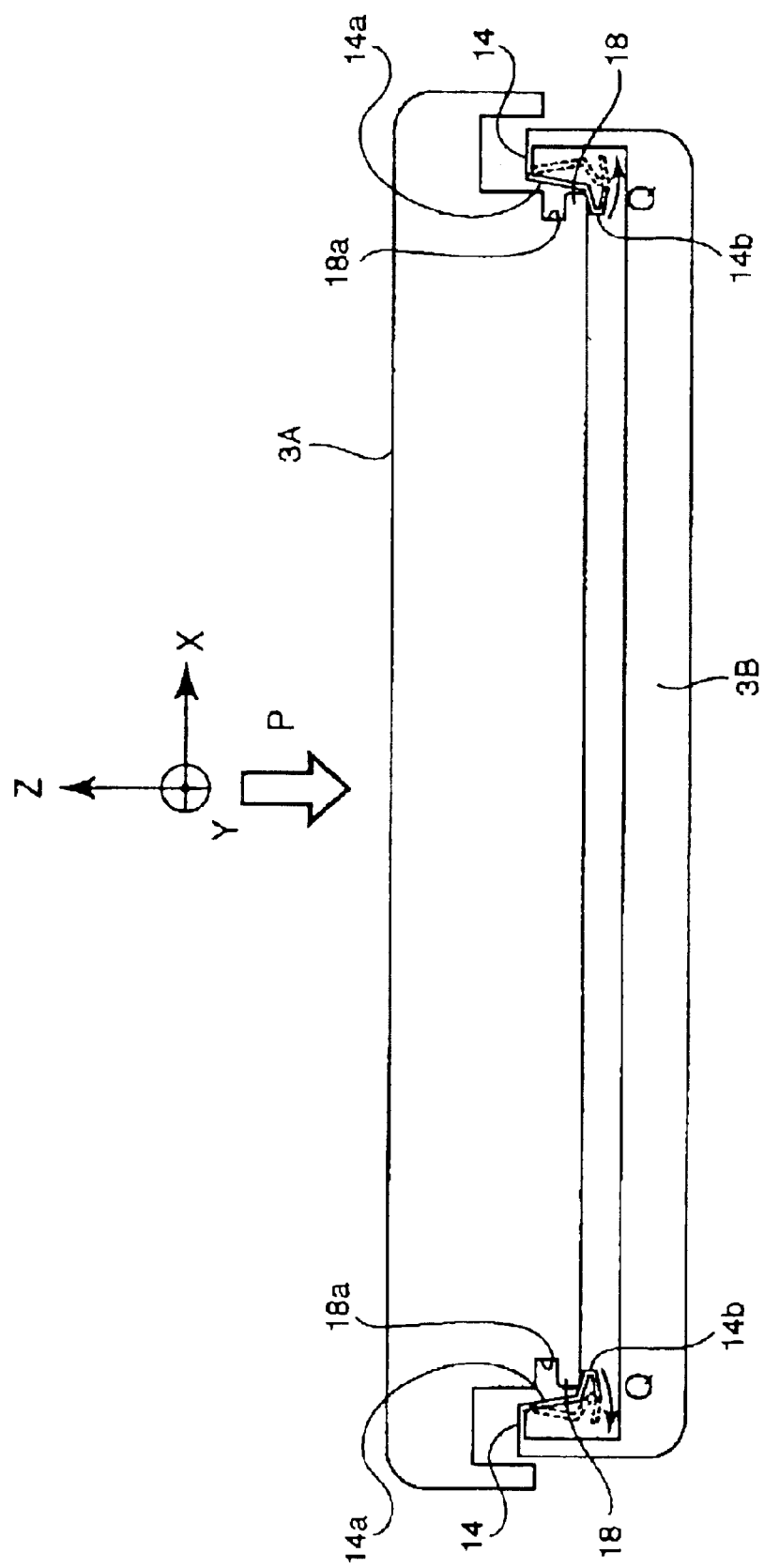
FIG. 7 is an explanatory view showing the attachment of the panel section 3A to the panel section 3B, in connection with FIG. 8, and illustrates a state immediately before the attachment.
Figure 8:
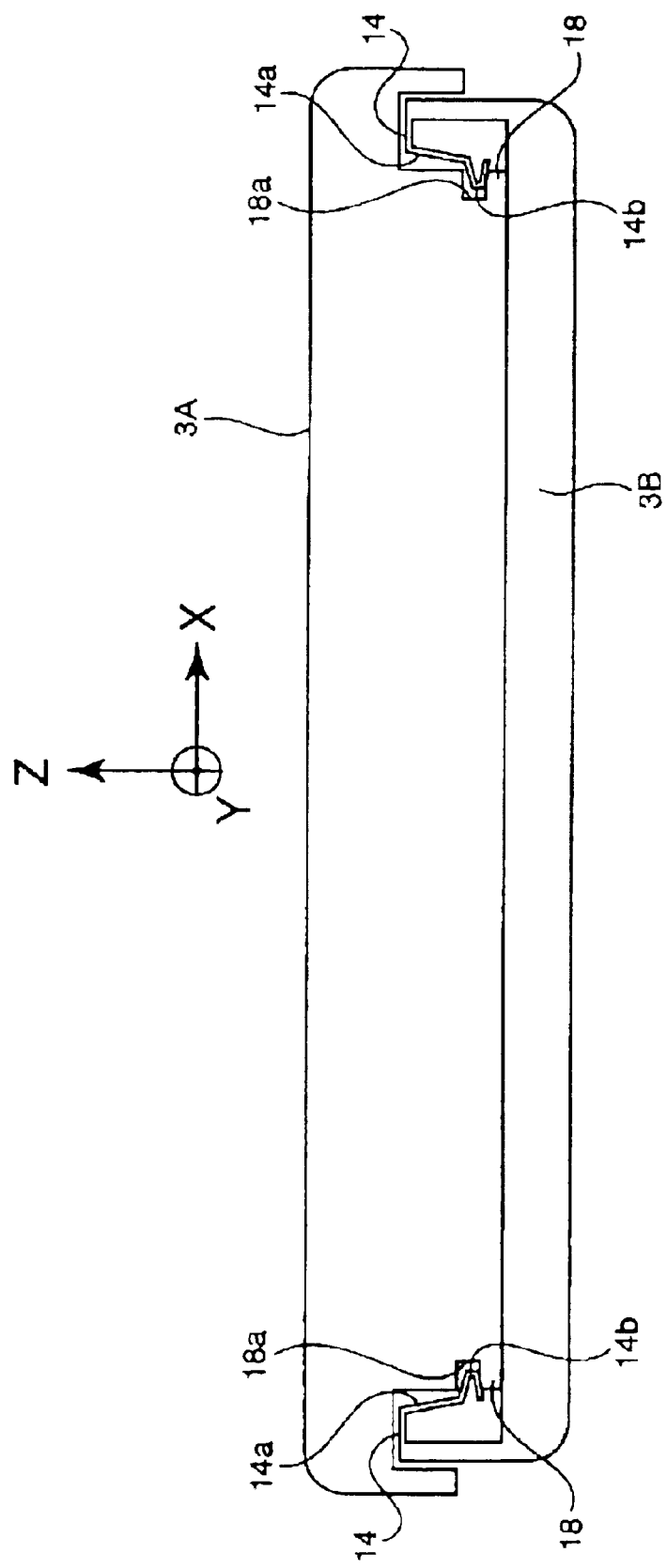
FIG. 8 is a view showing a state after the attachment.

FIGS. 7 and 8 schematically show a state in which the panel section 3A is attached to the panel section 3B, FIG. 7 shows a state immediately before the attachment, and FIG. 8 shows a state after the attachment. Regarding the setting of the above-described X-, Y-, and Z-axes in these figures, the Z-axis extends in the thickness direction of the panel sections, the X-axis orthogonal thereto extends in the longitudinal direction of the panel sections, and the Y-axis extends perpendicularly to the planes of the figures.

As shown in FIG. 5, hooks 14 made of an elastic member, such as a leaf spring, are respectively formed at both ends in the longitudinal direction of the panel section 3B, and are mounted on the back surface of the panel section 3B while pointing inward. Regarding the shape of these hooks, as shown in FIGS. 7 and 8, the hooks each include a portion 14a bent toward the display surface 11 of the panel section 3B and the like, and an engaging portion (leading end portion) 14b angularly bent from the portion 14a.

A socket 15a of a connector is disposed at a position on the back surface of the panel section 3B slightly offset from the center to the left. The socket 15a is connected to a plug (19), which will be described later, formed in the panel section 3A.

An engaging shaft 16 protrudes from the back surface in the Z-axis direction on the right upper side of the socket 15a so as to be engaged with a hook member (20), which will be described later, formed in the panel section 3A.

A connection-detecting switch 17 disposed at about the center of the back surface of the panel section 3B, and detects whether or not the panel section 3A is attached to the panel section 3B. Reference numeral 15b denotes a flexible printed board that connects the panel sections 3A and 3B and the body section 2, receives power from the body section 2, and sends and receives data.

The panel section 3A is provided with guides 18 that are formed at both ends in the longitudinal direction thereof corresponding to the above-described hooks 14, as shown in FIG. 6. These guides are respectively provided with grooves 18a that are formed on the side faces of a portion of the panel section 3A serving as a mounting surface to be attached to the panel section 3B, as shown in FIGS. 7 and 8, and the engaging portions 14b of the hooks 14 are engaged with the corresponding grooves in the state shown in FIG. 8.

A plug 19 is formed on the back surface of the panel section 3A shown in FIG. 6 corresponding to the above-described socket 15a. The plug constitutes a connector (a detach connector having a detachable electrical contact) together with the socket 15a, and data communication is performed between the panel sections through the connector.

In FIG. 6, a hook member 20 is formed on the upper right side of the plug 19 and substantially corresponding to the engaging shaft 16, and is mounted on the panel section 3A so that it can move along the X-axis direction.

Figure 9:
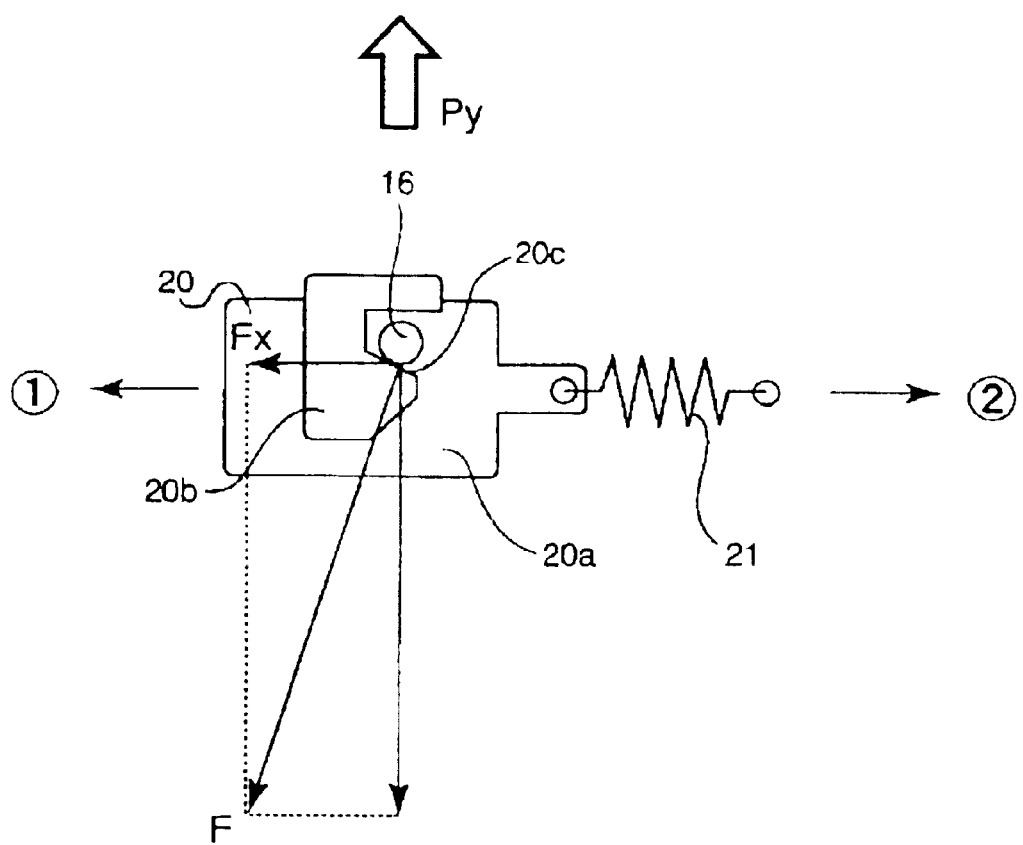
FIG. 9 is an explanatory view showing the engaging relationship between an engaging shaft and a hook member.

FIG. 9 shows the principal part in order to explain the engaging relationship between the engaging shaft 16 and the hook member 20. In this figure, the X-, Y-, and Z-axes are set in a manner similar to that in FIGS. 5 and 6.

The hook member 20 is movable in the direction "1" along the X-axis, and includes a slide plate 20a urged in the direction "2" along the X-axis (opposite to the direction "1") by an elastic member (tension coil spring) 21, and a hook portion 20b formed integrally therewith. In this figure, the hook portion 20b is retained by the engaging shaft 16. A portion of the hook portion 20b retained by the engaging shaft 16 is provided with an inclined face 20c inclined with respect to the X-axis direction.

When connecting the panel section 3A to the panel section 3B, first, the panel section 3A is pushed toward the panel section 3B, as shown by arrow P in FIG. 7. Since the guides 18 abut and push the engaging portions 14b of the hooks 14 aside, the hooks 14 are bent by elasticity, as shown by arrows Q.

In a state in which the panel section 3A is further pushed and is completely attached, the engaging portions 14b of the hooks 14 are engaged with the corresponding grooves 18a of the guides 18, thereby regulating the movement of the panel section 3A in the Z-axis direction and the X-axis direction.

Although the panel section 3A may move in the Y-axis direction, since the hook portions 20b of the hook member 20 is retained by the engaging shaft 16, as shown in FIG. 9, the movement in the Y-axis direction is also regulated. Consequently, the panel section 3A is held in a state shown in FIG. 8 in which it cannot move in any axis direction.

When detaching the panel section 3A from the panel section 3B, the panel section 3A is removed in the direction of arrow Py in FIG. 9. When a load in the Y-axis direction (removing direction) increases to a certain value, the hook member 20 moves in the direction "1" against the force of the elastic member 21 by a component Fx of a reaction force F at the contact portion between the inclined face 20c of the hook member 20 and the engaging shaft 16. When the hook portion 20b is disengaged from the engaging shaft 16, the movement of the panel section 3A in the Y-axis direction is deregulated, and therefore, the panel section 3A can be easily slid and detached from the panel section 3B.

As described above, the panel section 3A can be connected to the panel section 3B or can be detached from the panel section 3B with a relatively simple structure, that is, the movement of the panel section 3A in the Z-axis direction and the X-axis direction is regulated by engaging the engaging portions 14b of the hooks 14 and the grooves 18a of the guides 18, and the movement of the panel section 3A in the Y-axis direction is regulated by retaining the hook portion 20b of the hook member 20 and the engaging shaft 16. Therefore, the ease of use is improved. Moreover, the number of components is relatively small, and this is cost-effective.

In the state shown in FIG. 8, the plug 19 of the panel section 3A is connected to the socket 15a of the panel section 3B, and display data and the like are exchanged between the panel sections through the connection of the detach connector including the socket 15a and the plug 19. It is possible to liken the plug 19 and the socket 15a to a key and a corresponding keyhole, and to furnish both with the same password (identification code), and to use the panel section 3A as a kind of key (key member). Only when the panel section 3A is attached to the panel assembly or the panel section 3B, the apparatus may be allowed to operate (function). That is, when a control section (not shown) in the body section detects the connection between the plug 19 and the socket 15a (connection between the electrical contacts), the attached panel section is authenticated in order to determine whether or not the panel section is authorized. After it is determined that the panel section is authorized, the control section formally permits the operation of the apparatus (this can be easily achieved by software processing using a microcomputer).

That is, a password (identification code) is stored in a nonvolatile ROM of a microcomputer disposed inside the electronic apparatus 1. When the panel section 3A corresponds to the electronic apparatus 1, a password in one-to-one correspondence with (coincident with) the password of the electronic apparatus 1 is already written in a memory in the panel section 3A. Therefore, when the plug 19 of the panel section 3A is put into the electronic apparatus 1, that is, into the socket 15a of the panel section 3B, the socket 15a and the plug 19 are connected, power is supplied from the electronic apparatus 1 through the flexible printed board 15b, and it is detected whether or not the password of the panel section 3A coincides with the password of the body section 2 in the electronic apparatus 1. While the body section 2 of the electronic apparatus 1 can be operated through the panel section 3A when both the passwords coincide, it is determined that the panel section does not correspond to the body section 2 of the electronic apparatus 1 when the passwords do not coincide, so that the electronic apparatus is guarded so that it cannot be operated. In a state in which the panel section is removed, the operation of the apparatus is impossible, and therefore, security is ensured for theft prevention.

In the state shown in FIG. 2, the panel assembly 3 is closed in the first position. Therefore, only the control surface and the display surface of the panel section 3A are externally exposed (the control surface and the display surface of the panel section 3B are hidden).

When using the panel section 3B, the control surface and the display surface thereof need to be exposed by opening the panel assembly forward from the state shown in FIG. 2. That is, the two panel sections 3A and 3B of the panel assembly 3 are placed with their backs facing each other in a state in which the panel section 3A is attached, a driving mechanism for changing the attitude of the panel assembly 3 is provided so that the control section of the panel section 3A can be easily operated and the display sections 11 and 12 can be easily viewed in the first positional state, and so that the control section of the panel section 3B can be easily operated and the display section 8 can be easily viewed.

FIGS. 10 to 16 illustrate the principal part of the driving mechanism for changing the attitudes of the panel assembly and the support section thereof, and show an example of the configuration using a driving cam and two arm members (transparently shown).

Figure 10:
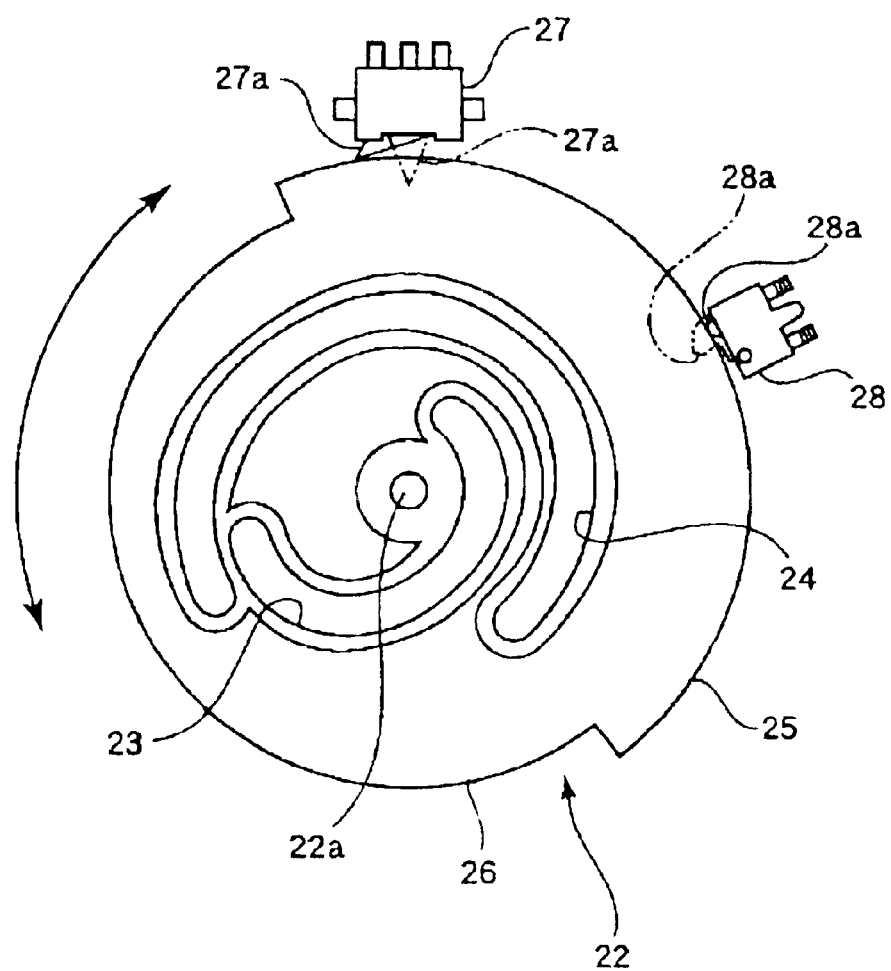
FIG. 10 is an explanatory view of a driving mechanism for the panel assembly, in connection with FIGS. 11 to 16, and illustrates a driving cam and detection means therefor.

As shown in FIG. 10, a disk-shaped driving cam 22 is rotated about a center shaft 22a that is mounted in a chassis plate in parallel with a left side plate of the body section 2 inside the body section 2, and for example, is controlled by a known mechanism that has a motor as a driving source and that uses a worm and a worm wheel.

The driving cam 22 is provided with two C-shaped concave cams 23 and 24, one of the cams 23 is placed on the inner side close to the rotating center 22a, and the cam 24 is placed on the outer side thereof.

In the outer peripheral surface of the driving cam 22, a peripheral surface portion 25 centered on the center shaft 22a and having a large diameter and a peripheral surface portion 26 having a diameter smaller than that of the peripheral surface portion 25 are formed over predetermined angular ranges.

Of detection means (detection switches) 27 and 28 provided for the driving cam 22, one detection means 27 detects the opening and closing state of the panel assembly 3 relative to the body section 2, and the other detection means 28 detects a detachment position (or a removing position) at which the panel section 3A can be easily detached. In the detection means 27, detection signals corresponding to the open position, the neutral position, and the close position are obtained by the detection of three states of a detector 27a (in the figure, the detector 27a is turned leftward from the neutral position shown by a two-dot chain line while being in contact with the peripheral surface portion 25 of the driving cam 22). The detection means 28 is provided for position detection, and detection signals indicating whether or not the panel assembly 3 is placed at the detachment position are obtained by the detection of two states of a detector 28a (in the figure, the detector 28a is retracted from its protruding position shown by a two-dot chain line while being in contact with the peripheral surface portion 25 of the driving cam 22).

Figure 11:
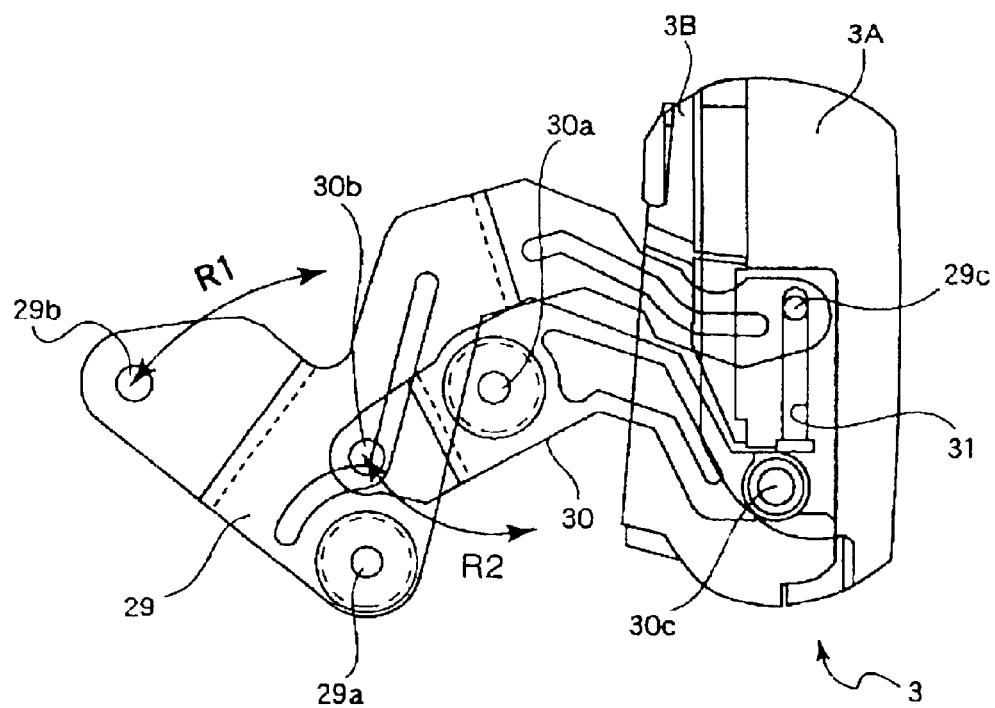
FIG. 11 is a view of the panel assembly and driving arms therefor.

FIG. 11 shows an example of the configuration of a driving section for the panel assembly.

The panel section 3B serving as the support section of the panel assembly 3 is supported and its attitude is controlled by support arms, that is, a first arm 29 and a second arm 30. One end of each of the driving arms protrudes from the body section 2 so as to support the panel section 3B on a side face thereof.

The first arm 29 includes a V-shaped portion and a connecting portion connected thereto, and a pivot 29a is mounted on the side face of the body section 2. An engaging portion 29b formed at one end of the V-shaped portion of the arm is engaged with a recess of the above-described cam 23, and the first arm 29 pivots about the pivot 29a, as shown by arrow R1, in conjunction with the turning of the driving cam 22. An engaging projection 29c is formed at the other end, that is, at the leading end of the connecting portion, and is engaged with a slide groove 31 (extending in the above-described Y-axis direction) formed at one end in the longitudinal direction of the panel section 3B (a portion in which the above-described hook 14 is formed). Accordingly, when driving is performed with the engaging portion 29b engaged with the cam 23, the engaging portion functions as a point of force, and the engaging projection 29c functions as a point of action.

A pivot 30a of the second arm 30 is mounted on the side face of the body section 2, an engaging portion 30b formed at one end of the arm is engaged with a recess of the above-described cam 24, and the second arm 30 pivots about the pivot 30a, as shown by arrow R2, in conjunction with the turning of the driving cam 22. A portion of the arm 30 disposed on the opposite side of the engaging portion 30b is bent like a crank, and its leading end is mounted as a pivot support portion 30c on the end in the longitudinal direction of the panel section 3B (slightly separated from the slide groove 31). That is, the panel section 3B is supported by the arm 30 so that it can pivot about the pivot support portion 30c. When driving is performed with the engaging portion 30b engaged with the cam 24, the engaging portion functions as a point of force, and the pivot support portion 30c functions as a point of action.

FIGS. 10 and 11 and FIGS. 12 to 16, which will be described later, are left side views of the driving cam 22 mounted on the chassis plate that is disposed in parallel with the left side plate in the body section 2, and the arms 29 and 30.

As described above, the driving cam 22, the arms 29 and 30, and the detection means 27 and 28 constitute the driving mechanism (including a motor, a power transmission mechanism, and the like that are not shown) for the panel assembly.

Figure 12:
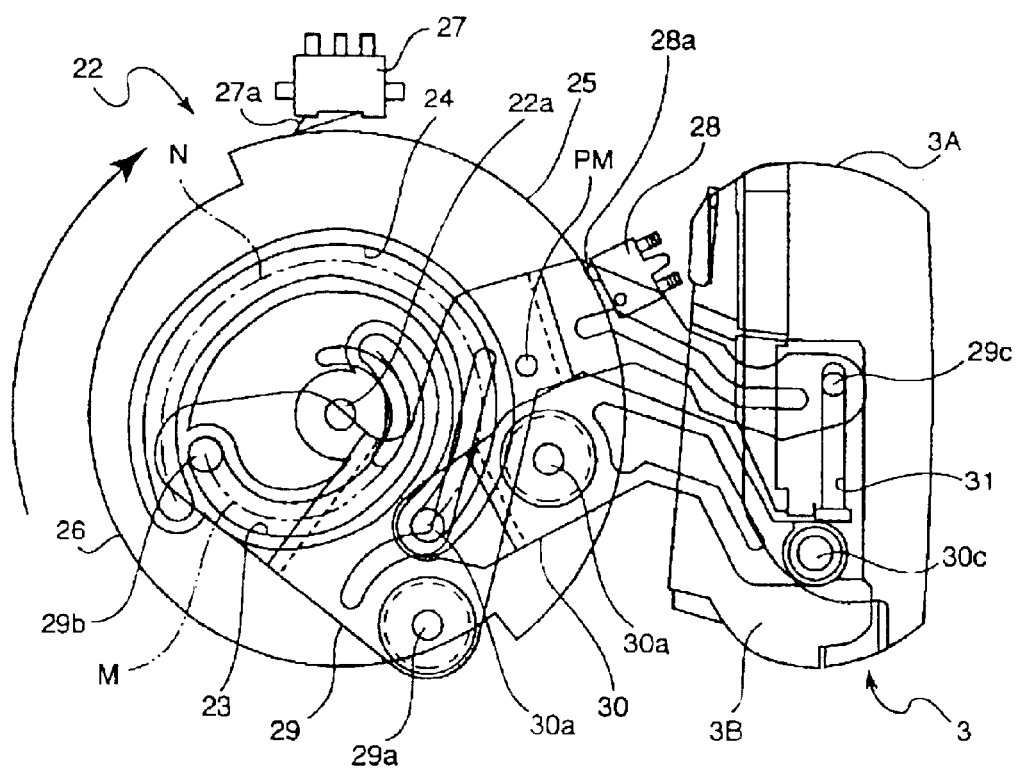
FIG. 12 is a view showing a state in which the panel assembly is closed.

FIG. 12 shows a state in which the engaging portions 29b and 30b of the arms 29 and 30 are engaged with the recesses of the cams 23 and 24 formed in the driving cam 22 shown in FIG. 10, and shows the first positional state in which the panel assembly 3 is closed with respect to the body section 2 so that the control section of the panel assembly 3A mounted in the panel assembly 3 can be easily operated and so that the display sections 11 and 13 can be easily viewed.

As shown in the figure, a path M of the cam 23 shown by a two-dot chain line corresponds to the position of the engaging portion 29b of the arm 29 inside the cam 23, and the engaging portion is placed at one end (left end) of the cam 23 in the figure. The engaging projection 29c of the arm 29 is placed close to one end of the slide groove 31 (close to the upper end in the figure).

A path N of the cam 24 shown by a one-dot chain line corresponds to the position of the engaging portion 30b of the arm 30 inside the cam, and the engaging portion is placed at one end (right end) of the cam 24 in the figure.

The detector 27a of the detection means 27 is pushed and turned to the left of the figure by the peripheral surface portion 25 of the driving cam 22, and it is thereby detected that the panel assembly 3 is closed (close position). The detector 28a of the detection means 28 is retracted by the peripheral surface portion 25 of the driving cam 22.

A circle PM in the figure represents a mark (position mark) that makes the phase of the driving cam 22 easier to understand. In FIG. 12, the circle PM is slightly shifted clockwise from the position corresponding to the detection means 28.

In the state shown in. FIG. 12, the panel assembly 3 is closed by pressing the above-described control button 10, the insertion slot 4 and the like of the body section 2 are completely invisible from the outside. Moreover, since the panel section 3B is placed on the back side (on the side of the body section), only the panel section 3A is presented to the user.

Figure 13:
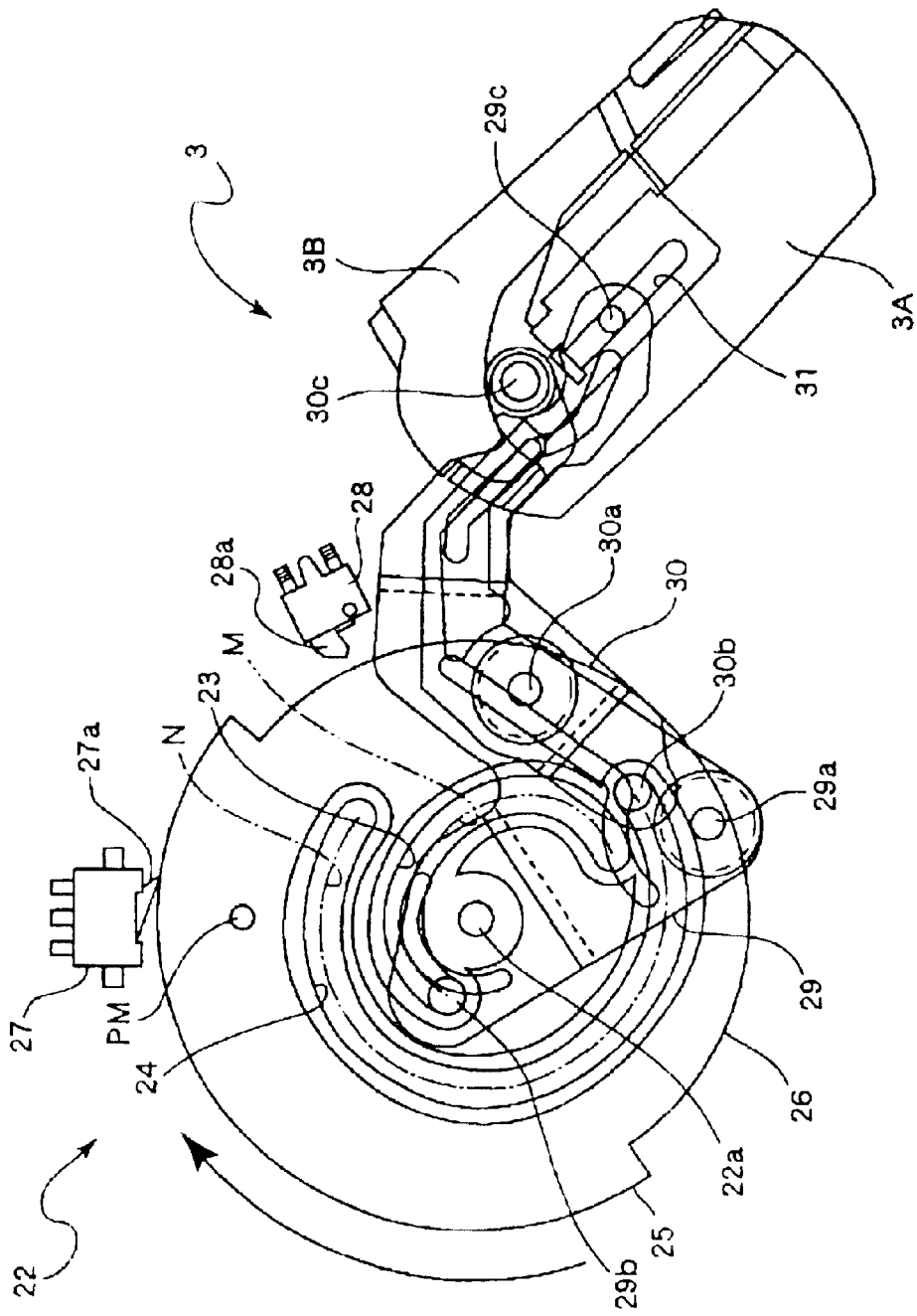
FIG. 13 is a view showing a state in which the panel assembly is opened.

FIG. 13 shows a state in which the panel assembly 3 is completely opened after the control button 13b is pressed, and this state corresponds to the above-described second positional state. That is, the driving cam 22 is turned clockwise from the state shown in FIG. 12, and the engaging portions 29b and 30b of the arms 29 and 30 are thereby placed on the opposite sides of the cams 23 and 24.

The engaging portion 29b of the arm 29 is placed at the other end of the cam 23 (the end opposite to that in FIG. 12), and the engaging projection 29c of the arm 29 is placed slightly offset from the center of the slide groove 31 toward the pivot support portion 30c.

The engaging portion 30b of the arm 30 is placed at the other end of the cam 24 (the end opposite to that in FIG. 12).

The detector 27a of the detection means 27 is pushed and turned to the right in the figure by the peripheral surface portion 25 of the driving cam 22, and it is thereby detected that the panel assembly is open (open position). The detector 28a of the detection means 28 protrudes toward the peripheral surface portion 26 of the driving cam 22.

The mark PM is placed at the position substantially corresponding to the detection means 27.

In the state shown in FIG. 13, the control surface and the display surface of the panel section 3B tilt while facing forward (toward the user). That is, the panel section 3A is placed on the back side (lower side), and the panel section 3B is presented to the user.

Figure 14:
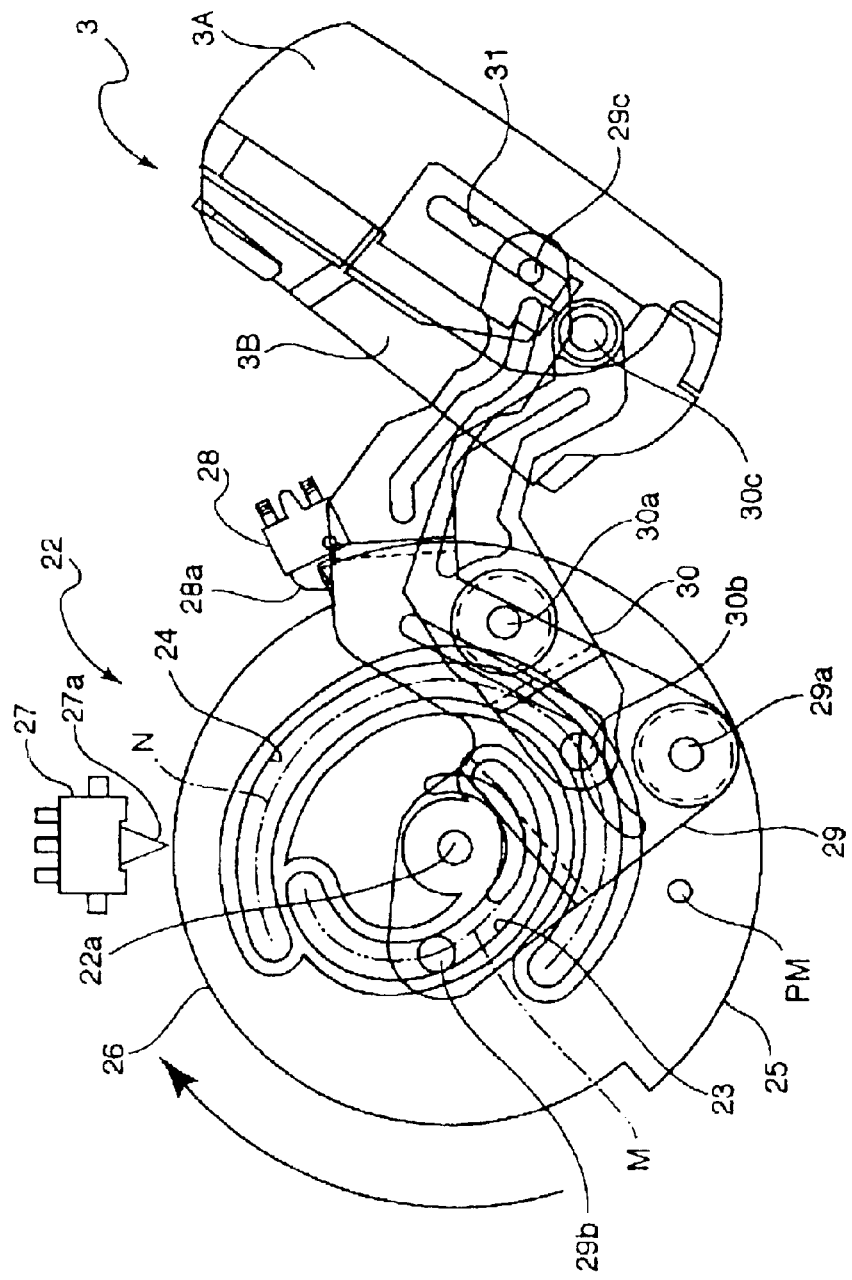
FIG. 14 is a view explaining an operation of detaching the panel section 3A, in connection with FIGS. 15 and 16, and illustrates a state in which the panel section is placed at a detachment position.
Figure 15:
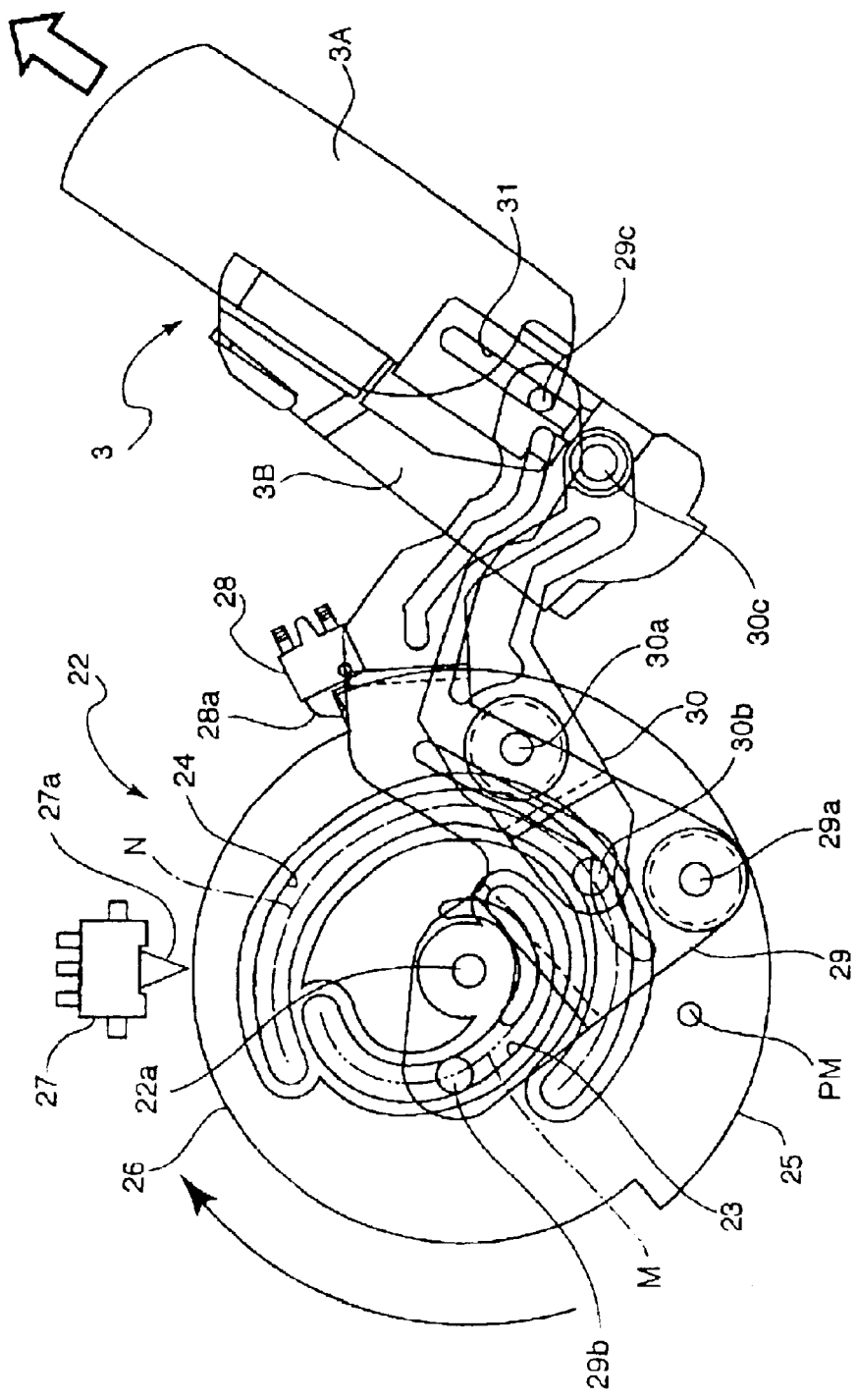
FIG. 15 is a view showing a state in which the panel section 3A is being removed.
Figure 16:
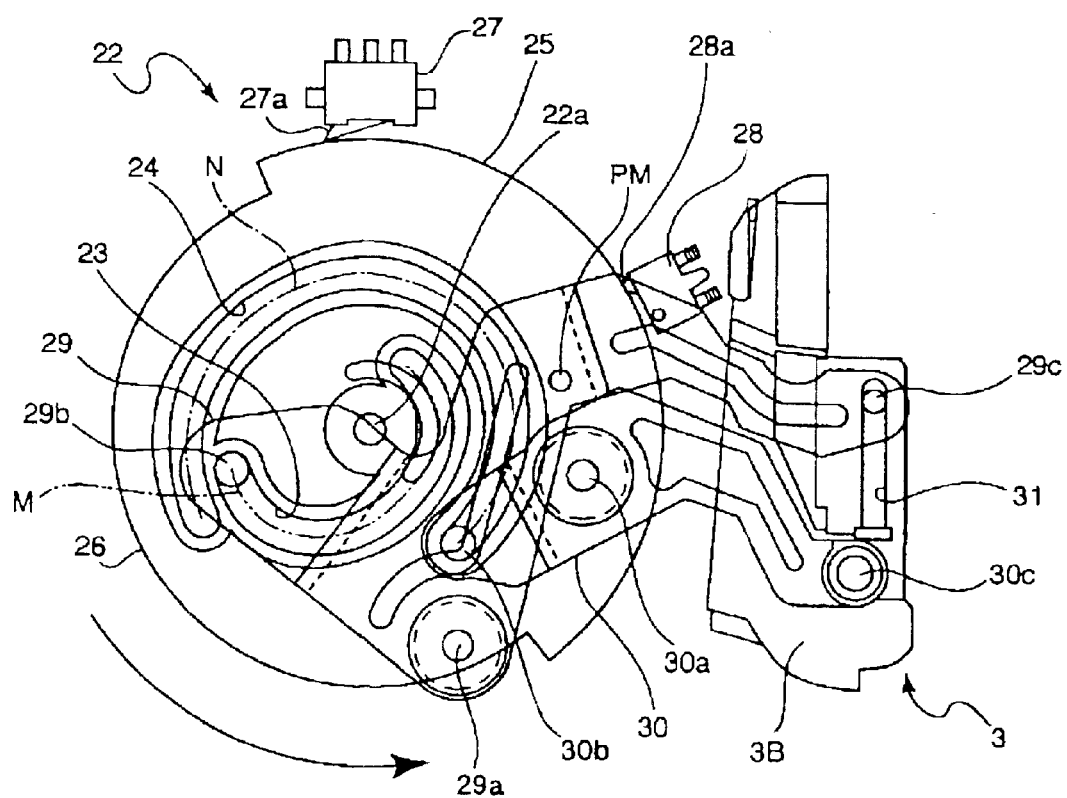
FIG. 16 is a view showing a state in which the panel section 3B is returned to a close position after the panel section 3A is detached.

FIGS. 14 to 16 show the states and motions of the components when the panel section 3A is detached.

FIG. 14 shows the detachment position of the panel section, in which the support section (panel section 3B in this embodiment) for the panel section 3A is placed while tilting toward the front of the apparatus. That is, the panel assembly 3 tilts between the first positional state shown in FIG. 12 and the second positional state shown in FIG. 13, that is, it is placed in a third positional state.

In this case, the engaging portion 29b of the arm 29 is positioned at some point in the cam 23 (a point before the midpoint of the path M), and the engaging projection 29c of the arm 29 is positioned offset from the center of the slide groove 31 toward the pivot support portion 30c.

The engaging portion 30b of the arm 30 is positioned at some point in the cam 24 (a point before the midpoint of the path N), and the pivot support portion 30c of the arm 30 is positioned on the lower left side of the engaging projection 29c.

The detector 27a of the detection means 27 is not in contact with the peripheral surface portion 26 of the driving cam 22, and is placed straight in the neutral position (a position in which the detector 27a is not turned to the right or left). The detector 28a of the detection means 28 protrudes close to the boundary between the peripheral surface portions 25 and 26 of the driving cam 22. That is, while the detector 28a has been retracted by the contact with the peripheral surface portion 25 of the driving cam 22, as shown in FIG. 12, it protrudes when shifting from the peripheral surface portion 25 to the peripheral surface portion 26 in conjunction with the turning of the driving cam 22. This state change of the detector 28a is detected and this indicates the detachment position.

The mark PM is placed at a position shifted slightly clockwise from the position opposite to the detection means 27.

FIG. 15 shows a state in which the panel section 3A is being removed in the direction shown by the arrow from the panel assembly 3 which is tilted in the third position shown in FIG. 14, and the operation and process of detaching the panel section 3A from the panel section 3B are as described above.

FIG. 16 shows a state in which the panel assembly 3 automatically returns to the same state as in FIG. 12 (however, the panel section 3A is removed) after the panel section 3A is detached.

In this case, since the driving cam 22 is turned counterclockwise in the figure, the panel section 3B serving as the support section moves rearward. Since the panel section 3B returns to its initial position before detachment, the front surface 2a of the body section 2 is closed by the panel section 3B, and the disk insertion slot and the like are hidden. Since the panel section 3A is removed, the back of the panel section 3B (see FIG. 5) is externally exposed when the apparatus is viewed from the front side).

The connection-detecting switch 17 mounted on the panel section 3B detects that the panel section 3A has been detached. After that, the tilting panel section 3B is placed in a substantially vertical position, is automatically driven so as to close the front surface of the body section 2, and is finally brought into the state shown in FIG. 16. Since the relationship between the arms and the cams, the states of the detection means, and the like are the same as those in FIG. 12, descriptions thereof are omitted.

When the panel section 3B is thus moved back toward the body section by the driving mechanism after the panel section 3A is detached, and automatically returns to the state before the panel section 3A is detached, it is not left protruding from the body section, and therefore, it is not obstructive. Moreover, since a special operation is unnecessary, the ease of use can be improved. While FIGS. 10 to 16 are left side views of the driving cam 22 and the arms 29 and 30 mounted on the chassis plate in parallel with the left side plate of the body section 2 inside the body section 2, a chassis plate is also provided in parallel with the right side plate, and a driving cam 22 and arms 29 and 30 are similarly and symmetrically provided, thereby performing simultaneous and symmetrical operations. Since the figures and descriptions thereof are redundant, they are omitted.

Figure 17:
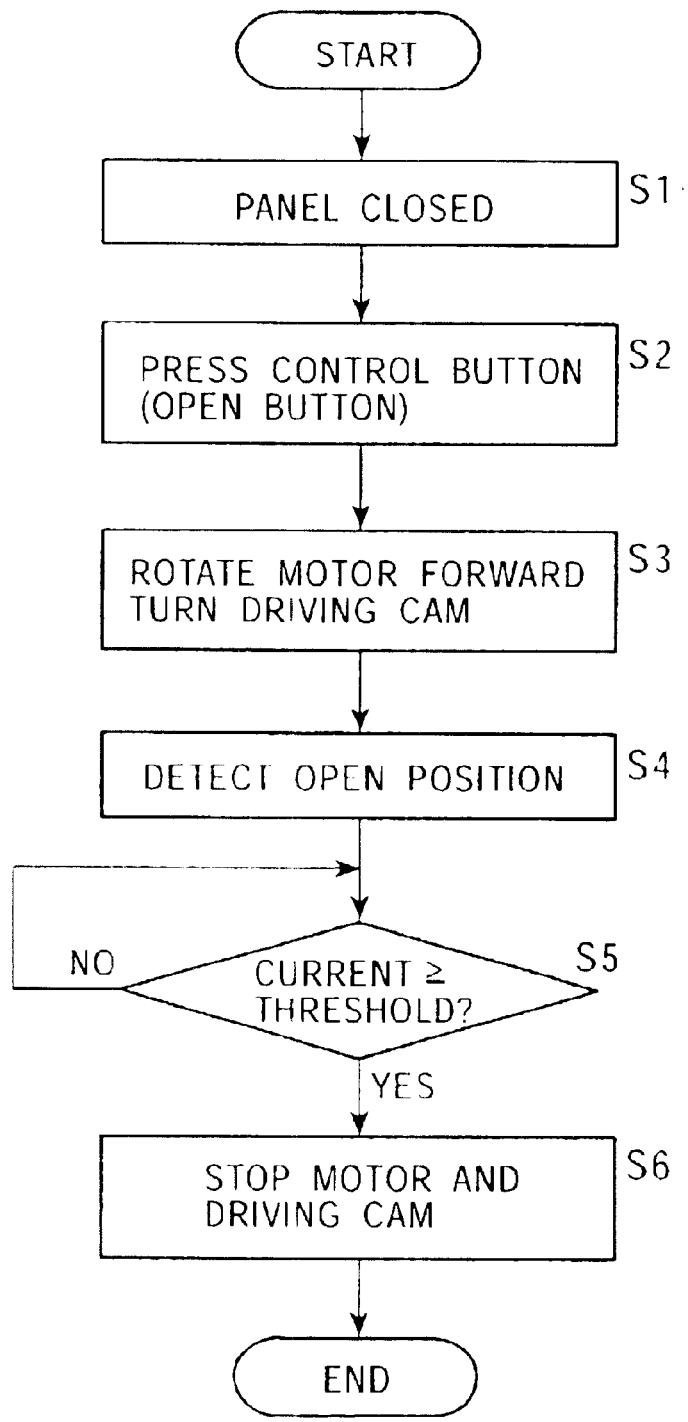
FIG. 17 is a flowchart showing the procedure for opening the panel assembly to use the panel section 3B.
Figure 18:
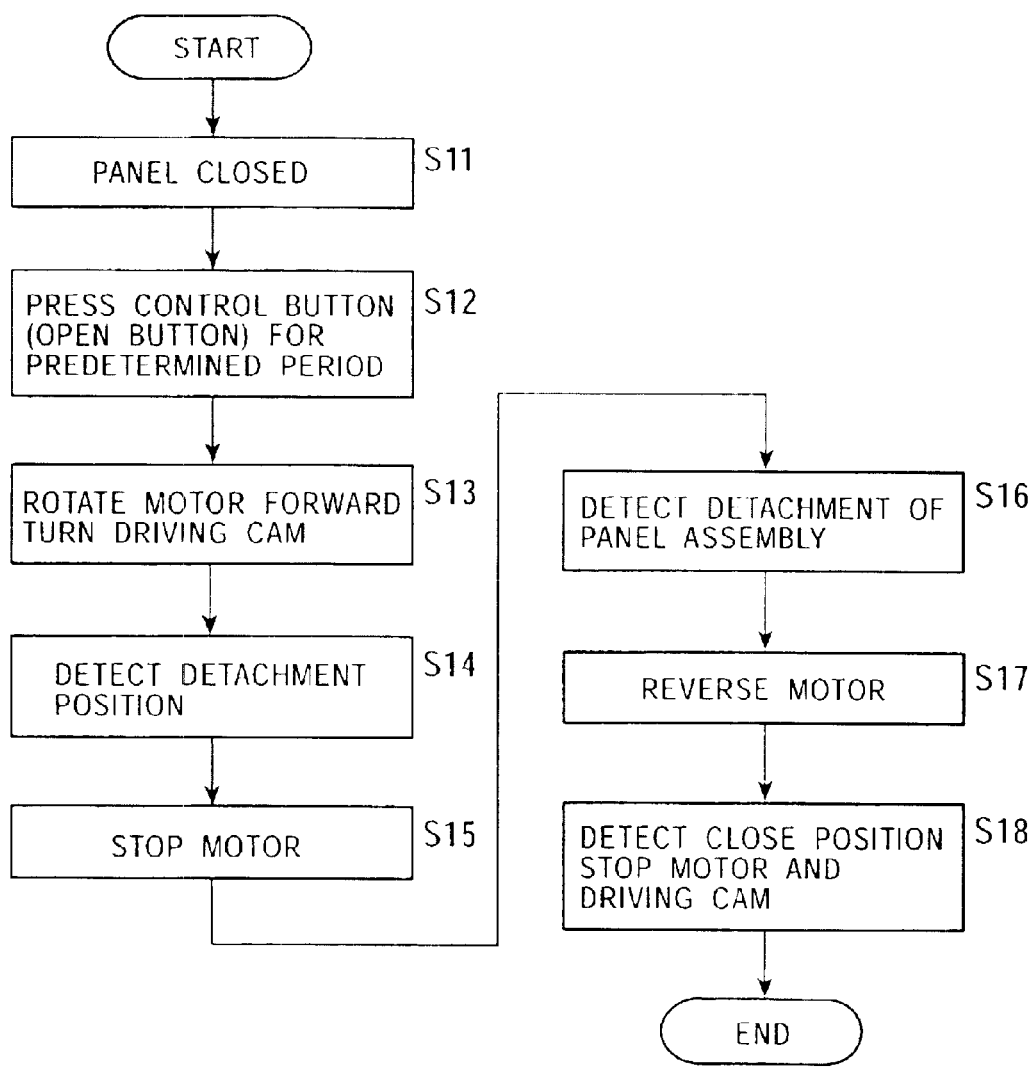
FIG. 18 is a flowchart showing the procedure for placing the panel assembly at the detachment position and detaching the panel section 3A.

The electronic apparatus 1 incorporates a control section, that is, a master control microcomputer. As one of the programs executed by a CPU (Central Processing Unit) of the computer, for example, subroutines for processing shown in FIGS. 17 and 18 are prepared. These figures show only the portions relevant to the present invention.

FIG. 17 is a flowchart showing the procedure for opening the panel assembly to use the panel section 3B.

First, in Step S1, the panel assembly 3 is closed (see FIG. 12).

In Step S2, when the control button 13b of the panel section 3A is instantaneously pressed for a short period, the driving cam 22 is turned in conjunction with the forward rotation of the motor in Step S3 (see the arrow representing the clockwise direction in FIG. 12).

When the open position is detected by the detection means 27 in Step S4 (see FIG. 13), the detection of the current of the motor is started. When it is detected in Step S5 that the motor current value is more than or equal to a threshold, the rotation of the motor is stopped in Step S6, and the turning of the driving cam 22 is stopped. The position (phase) of the cam in this state serves as the open position, and the panel assembly is open, as shown in FIG. 13.

In order to close the panel assembly, the motor is reversed by continuously pressing the control button 10 of the panel section 3B for a predetermined period, and the above-described procedure is exactly reversed. That is, the close position is detected by the detection means 27. The position (phase) of the cam when the motor is stopped serves as the close position, and the panel assembly is closed, as shown in FIG. 12.

FIG. 18 is a flowchart showing the procedure for detaching the panel section 3A from the panel assembly placed in the detachment position.

First, the panel assembly 3 is closed in Step S11 (see FIG. 12).

In Step S12, the control button 13b of the panel section 3A is continuously pressed for a relatively long period of 1.5 seconds or more. Then, the driving cam 22 is turned in conjunction with the forward rotation of the motor in Step S13 (see the arrow representing the clockwise direction in FIG. 12). The microcomputer detects whether the control button 13b is pressed for a relatively short time or a relatively long time.

In Step S14, the detachment position of the panel section 3A is detected by the detection means 28 (see FIG. 14), the motor is thereby stopped in Step S15, and therefore, the turning of the driving cam 22 is stopped.

When the connection-detecting switch 17 detects in Step S16 that the panel section 3A is detached, the microcomputer detects this state, and issues a command to reverse the motor in Step S17. The driving cam is turned in the opposite direction by the motor (see the arrow representing the counterclockwise direction in FIG. 16). In Step S18, the close position is detected by the detection means 27, and the motor is then stopped. The position (phase) of the cam in this state serves as the close position, and the panel assembly is closed, as shown in FIG. 16 (automatic return of the panel section 3B).

The above-described configuration provides the following various advantages:

Even when the panel size is fixed, a sufficient space in which the control buttons and the display elements are arranged can be ensured by providing panel sections, each having a control surface and a display surface, on the front and back sides, respectively.

Of the two panel sections 3A and 3B, one panel section 3A principally performs display by omitting the maximum possible number of control buttons and the like so as to mainly use the display surface, and by incorporating therein large display elements and display devices having high visibility. The other panel section 3B principally performs control operation by using the minimum number of display elements and arranging control buttons of a required size. In this way, the panel sections can play separate roles, or can be designed so as to make use of the individual characteristics. This can increase the degree of freedom in design.

By switching between the front and back panel sections with substantially different designs, an apparatus having two designs can be achieved. Therefore, the apparatus has pronounced external characteristics, and marketability can thus be improved.

Since the panel section 3B advances and tilts at the detachment position of the panel section 3A, the panel section 3A can be easily detached. The panel section automatically returns to its initial state after detachment, and thus the ease of operation is improved. Since the front surface of the body section is closed by the panel section 3B, it is possible to prevent dust and the like from entering the body section.

Of the two panel sections 3A and 3B, one panel section 3A principally performs display by omitting the maximum possible number of control buttons and the like so as to mainly use the display surface, and by incorporating therein large display elements and display devices having high visibility. The other panel section 3B principally performs control operation by using the minimum number of display elements and arranging control buttons of a required size. In this way, the panel sections can play separate roles, or can be designed so as to make use of the individual characteristics. This can increase the degree of freedom in design.

By switching between the front and back panel sections with substantially different designs, an apparatus having two designs can be achieved. Therefore, the apparatus has pronounced external characteristics, and marketability can thus be improved.

What is claimed is:

1. An electronic apparatus comprising:
    a panel assembly pivotably mounted at a front surface of said electronic apparatus, wherein said panel assembly includes a first panel section and a second panel section supporting said first panel section;
    said second panel section including at least a control section and said first panel section including at least a display section, whereby at least a control section and a display section are formed on both the front and back sides of said panel assembly; and
    a driving mechanism provided to turn said panel assembly relative to said front surface of said electronic apparatus, so that said first panel section or said second panel section faces outwardly from said front surface.

2. The electronic apparatus according to claim 1, wherein said first panel section is detachably mounted on said second panel section.

3. The electronic apparatus according to claim 2, wherein an identification code is stored in said electronic apparatus, and operation of said apparatus is enabled when said first panel section, in which an identification code coincident with said identification code of said electronic apparatus is written, is mounted on said second panel section.

4. An electronic apparatus having a pivotable panel assembly including a first panel section having at least a display surface and a second panel section on which said panel section is detachably mounted and having at least a control surface, said electronic apparatus comprising:
    a driving mechanism for driving and bringing said panel assembly into a position in which said second panel section is in contact with a front surface of said electronic apparatus and into a position in which said second panel section tilts so that an upper part of said second panel section is turned from said front surface of said electronic apparatus;
    a detecting section for detecting a detachment of said first panel section from said second panel section in the position in which said second panel section tilts; and
    a control section for controlling said driving mechanism to return said panel assembly to the position in which said second panel section is in contact with said front surface of said electronic apparatus in response to an output from said detecting section when said detecting section detects that said first panel section is detached from said second panel section.

5. An electronic apparatus having a pivotable panel assembly including a first panel section having at least a display surface and a second panel section on which said first panel section is detachably mounted and having at least a control surface, said electronic apparatus comprising:
    a driving mechanism for supporting said panel assembly in a first position in which said second panel section is in contact with a front surface of said electronic apparatus, in a second position in which said first panel section is in contact with said front surface of said electronic apparatus so that said second panel section is turned forward relative to a front of the electronic apparatus, and in a third position in which said second panel section tilts between the first position and the second position, so that said first panel section can be detached from said second panel section.

6. The electronic apparatus having a panel assembly according to claim 5, further comprising:
    a detecting section for detecting that said first panel section is detached from said second panel section in the third position; and
    means for driving said driving mechanism in response to an output from said detecting section so as to bring said second panel section into the first position.

* * * * *